(12) United States Patent
Yamada et al.

(10) Patent No.: US 9,514,375 B2
(45) Date of Patent: Dec. 6, 2016

(54) MULTI-BIOMETRIC AUTHENTICATION APPARATUS, AND MULTI-BIOMETRIC AUTHENTICATION SYSTEM

(71) Applicant: FUJITSU LIMITED, Kawasaki-shi, Kanagawa (JP)

(72) Inventors: Shigefumi Yamada, Sagamihara (JP); Teruchika Mabuchi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 73 days.

(21) Appl. No.: 14/060,994

(22) Filed: Oct. 23, 2013

(65) Prior Publication Data
US 2014/0185885 A1 Jul. 3, 2014

(30) Foreign Application Priority Data

Dec. 27, 2012 (JP) ................................. 2012-285742

(51) Int. Cl.
*G06K 9/00* (2006.01)
(52) U.S. Cl.
CPC ....... *G06K 9/00899* (2013.01); *G06K 9/00892* (2013.01); *G06K 2009/00932* (2013.01)
(58) Field of Classification Search
CPC .................... G06K 9/00892; G06K 9/00899; G06K 2009/00932
USPC .................................................. 382/115, 124
See application file for complete search history.

(56) References Cited

U.S. PATENT DOCUMENTS

| | | |
|---|---|---|
| 2006/0067566 A1 | 3/2006 | Hara |
| 2006/0291704 A1 | 12/2006 | McClurg |
| 2007/0014440 A1 | 1/2007 | Lo |
| 2010/0085151 A1 | 4/2010 | Hama et al. |
| 2012/0250954 A1* | 10/2012 | Nada .................. G06K 9/00087 382/124 |

FOREIGN PATENT DOCUMENTS

| | | |
|---|---|---|
| EP | 2506188 A2 | 10/2012 |
| JP | 2803281 B2 | 9/1998 |
| JP | 2002-132732 | 5/2002 |
| JP | 2006-099326 | 4/2006 |
| JP | 2006-277341 | 10/2006 |
| JP | 2007-323109 | 12/2007 |
| JP | 2010-092121 | 4/2010 |
| WO | 2008/154589 A2 | 12/2008 |
| WO | WO 2008/154589 A2 * | 12/2008 |

OTHER PUBLICATIONS

Extended European Search Report mailed on Feb. 3, 2015 for corresponding European Patent Application No. 13188662.4, 9 pages.

* cited by examiner

*Primary Examiner* — Edward Park
(74) *Attorney, Agent, or Firm* — Fujitsu Patent Center

(57) ABSTRACT

An authentication apparatus for authenticating using biometric information of a plurality of kinds including first information related to a first body part input into a first information inputting area and second information related to a second body part input into a second information inputting area includes an information existence detecting unit that detects a lack of the second information, a determination information acquiring unit that acquires information for lack determination based on third information related to the second body part input into the first information inputting area, and a pseudo lack determining unit that determines whether the lack is an actual lack or a pseudo lack based on the information for lack determination.

7 Claims, 13 Drawing Sheets

MULTI-BIOMETRIC AUTHENTICATION APPARATUS, AND MULTI-BIOMETRIC AUTHENTICATION SYSTEM

CROSS-REFERENCE TO RELATED APPLICATIONS

This application is based upon and claims the benefit of priority of the prior Japanese Patent Application No. 2012-285742 filed on Dec. 27, 2012, the entire contents of which are incorporated herein by reference.

FIELD

The embodiments discussed herein are related to a multi-biometric authentication apparatus, a multi-biometric authentication system, and a program for multi-biometric authentication.

BACKGROUND

In recent years, biometric authentication draws the attention of people as a technique for identity verification in information terminal devices. Japanese Laid-open Patent Publication No. 2006-277341 discloses multi-biometrics using two kinds of biometric information of palm vein authentication and fingerprint authentication used in a case where authentication accuracy in authenticating biometric information is insufficient.

SUMMARY

According to an aspect of the embodiment, an authentication apparatus for authenticating using biometric information of a plurality of kinds including first information related to a first body part input into a first information inputting area and second information related to a second body part input into a second information inputting area includes an information existence detecting unit that detects a lack of the second information; a determination information acquiring unit that acquires information for lack determination based on third information related to the second body part input into the first information inputting area; and a pseudo lack determining unit that determines whether the lack is an actual lack or a pseudo lack based on the information for lack determination.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

DESCRIPTION OF EMBODIMENTS

In a case where an individual whose biometric information is not partly input due to an injury of the individual in the multi-biometric authentication, this individual may be authenticated as a genuine individual in order to reduce a false rejection rate, which is a probability of failing authentication of the genuine individual. On the other hand, as the kinds of the biometric information to be acquired are reduced, an impersonation using a forgery or unjustly collected biometric information becomes easier.

Hereinafter, the embodiments are described below with reference to figures. Through all figures, the same references symbols are used for portions having the same function and repetitive explanations of these portions are omitted.

First Embodiment

Figure 1:
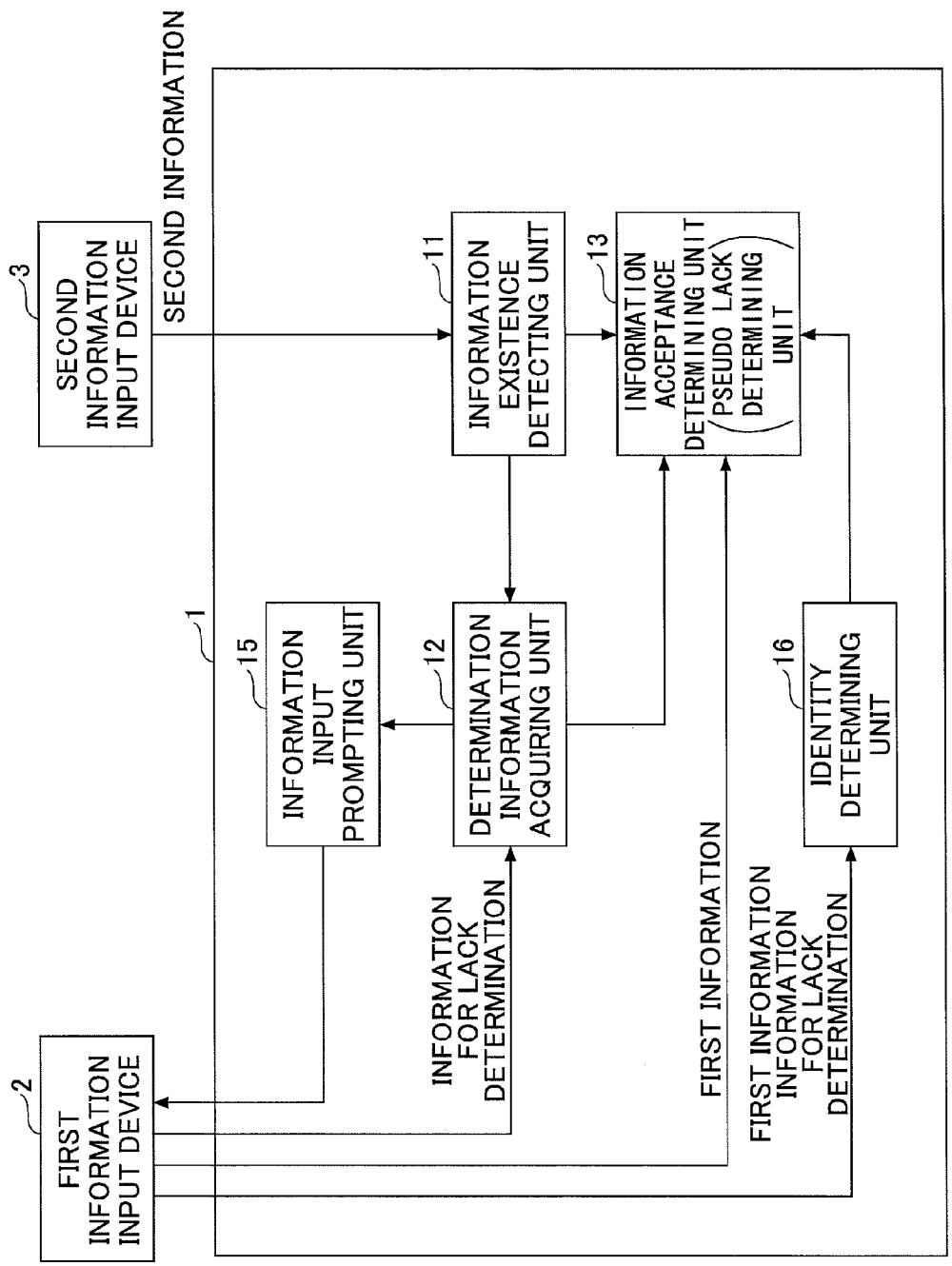
FIG. 1 is a block diagram illustrating a structure of a multi-biometric authentication apparatus of a first embodiment.

FIG. 1 is a block diagram illustrating a structural example of a multi-biometric authentication apparatus of a first embodiment. The multi-biometric authentication apparatus 1 is formed by a terminal such as a computer connected to first and second information input devices 2 and 3. The first information input device 2 and/or the second information input device 3 may be built in the terminal.

Hereinafter, the structure of the multi-biometric authentication apparatus illustrated in FIG. 1 is described. The multi-biometric authentication apparatus 1 includes an information existence detecting unit 11, a determination information acquiring unit 12, an information acceptance determining unit 13, an information input prompting unit 15, and an identity determining unit 16. The information for lack determination received from the first information input device 2 is input in the determination information acquiring unit 12. The first information from the first information input device 2 is received by the information acceptance determining unit 13. The first information and the information for lack determination, which are received from the first information input device 2, are input into the identity determining unit 16. The information input prompting unit 15 is connected to the first information input device 2. The second information from the second information input device 3 is input into the information existence detecting unit 11.

Figure 2:
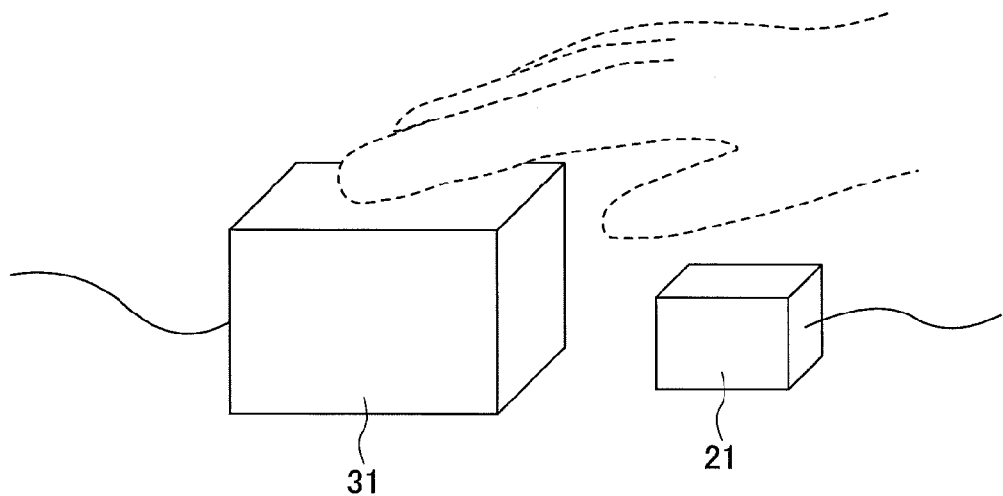
FIG. 2 illustrates an example of inputting biometric information into a first information input device and a second information input device in the first embodiment.

FIG. 2 illustrates an example of inputting biometric information into the first information input device 2 and the second information input device 3 in the first embodiment. The first information input device 2 is, for example, a palm vein sensor 21. The second information input device 3 is, for example, a fingerprint sensor 31. FIG. 2 illustrates, in a case where the first information input device 2 is the palm vein sensor 21 and the second information input device 3 is the fingerprint sensor 31, a relationship among a hand, the palm vein sensor 21, and the fingerprint sensor 31.

Figure 3:
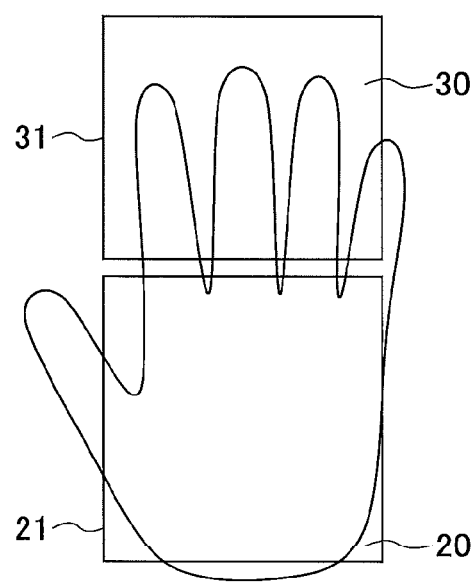
FIG. 3 illustrates an example of inputting biometric information into a first information inputting area and a second information input area in the first embodiment.

FIG. 3 illustrates an example of inputting biometric information onto the first information inputting area 20 and the second information inputting area 30 of the first embodiment. A first information inputting area 20 of the palm vein sensor 21 and a second information inputting area 30 of the fingerprint sensor 31 are arranged to face the palm. Therefore, the first information inputting area 20 can capture a first part such as palm veins. Further, the second information inputting area 30 can capture a second part such as fingerprints.

Figure 4:
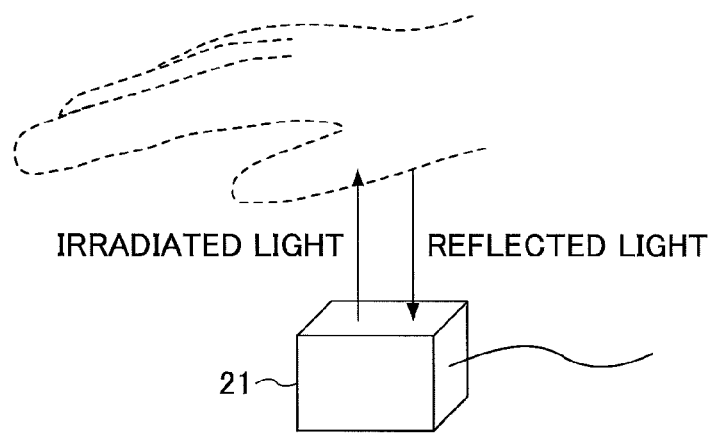
FIG. 4 illustrates an example of inputting biometric information into a palm vein sensor of the first embodiment.
Figure 5:
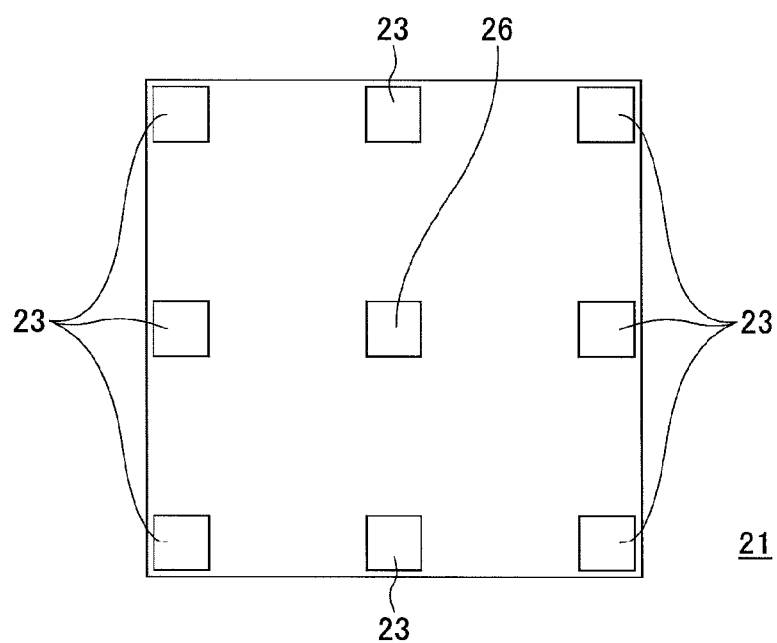
FIG. 5 is a schematic plan view illustrating a palm vein sensor of the first embodiment.

Specifically, the palm vein sensor as the first information input device 2 may be formed to convert an image of palm veins to a digital image and may be of a noncontact type. A structural example of the palm vein sensor 21 is illustrated in FIGS. 4 and 5. FIG. 4 illustrates an example of inputting biometric information into the palm vein sensor 21 of the first embodiment. FIG. 5 is a schematic plan view illustrating the palm vein sensor 21 of the first embodiment. Referring to FIG. 4, the palm vein sensor 21 irradiates the palm by a light and receives a reflection light reflected on the palm. Referring to FIG. 5, the palm vein sensor 21 emits a light onto the palm and receives a reflection light reflected on the palm. The number of the irradiation parts is, for example, 8. The irradiation parts are arranged so as to surround the image sensor 26. The irradiated light from the LED may be a near-infrared light. The palm reflects the irradiated light. By capturing an intensity distribution of the reflected light, an image of palm veins is acquired. Further, an image is acquired while the hand is detected by an input area of the palm vein sensor 21. Further, in a case where there is an instruction from the information input prompting unit 15 described below to a user, an image including fingers facing the input area of the palm vein sensor 21. These images are to be used as information for lack determination by the determination information acquiring unit 12 as described below. Referring to FIG. 5, an example of imaging the intensity distribution of the near-infrared light reflected on the palm is imaged. However, the intensity distribution of the near-infrared light transmitting through the palm may be imaged.

Figure 6:
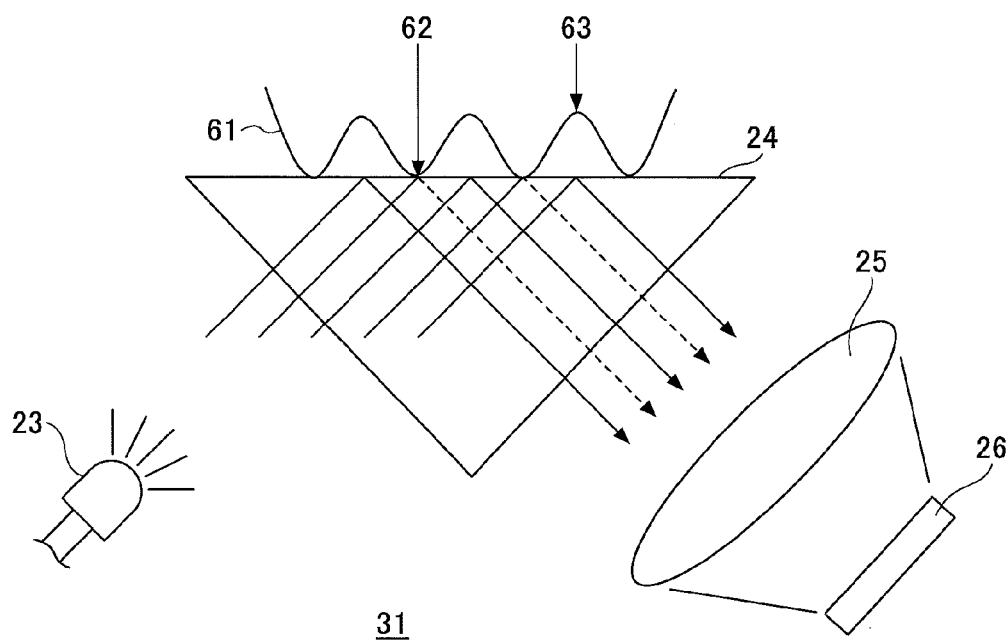
FIG. 6 is a schematic side view illustrating a structure of a fingerprint sensor of the first embodiment.

The second information input device 3 is not limited to a weak electrolytic type, a capacitance type, an optical type, thermosensitive type, or an ultrasonic type. The fingerprint sensor 31 as the second information input device 3 may convert a fingerprint image into a digital image. Referring to FIG. 6, an exemplary structure of the fingerprint sensor 31 of the optical type is illustrated. FIG. 6 is a schematic side view illustrating the structure of the fingerprint sensor 31 of the first embodiment. When the fingerprint is input, the finger touches the surface of a prism 24. A light-emitting diode (LED) irradiates the finger contacting a surface of the prism 24 with a light. The irradiated light is reflected at ridges 62 and talwegs 63 on a finger surface 61. The reflected light is captured through a lens by an image sensor 26 of a charged-coupled device (CCD), a complementary metal-oxide semiconductor, or the like. Thus, the fingerprint image is acquired. On the surface of the prism 24 where the finger contacts, the ridges 62 on the finger surface 61 directly contacts the surface of the prism 24 and the talwegs 63 on the finger surface 61 is apart from the surface of the prism 24 without contacting the surface of the prism 24. The irradiated light randomly scatters at the ridges 62 to weaken the reflected light at the ridges 62. Therefore, intensity distributions of the light differ for the ridges 62 and the talwegs 63 of the fingerprints on the captured image.

The palm vein sensor 21 and the fingerprint sensor 31 are arranged as illustrated in FIG. 2. Because of this arrangement, palm veins and fingerprints of a plurality of fingers are simultaneously input by a single input operation of positioning the hand over the palm vein sensor 21 and the fingerprint sensor 31.

Figure 7:
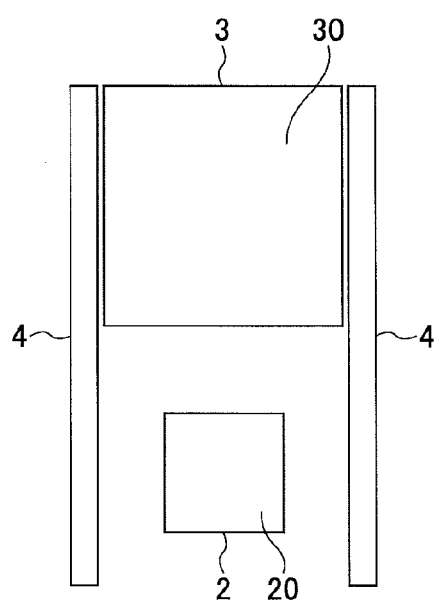
FIG. 7 is a plan view for illustrating an exemplary arrangement of the first information input device, the second information input device, and the guide of the first embodiment.
Figure 8:
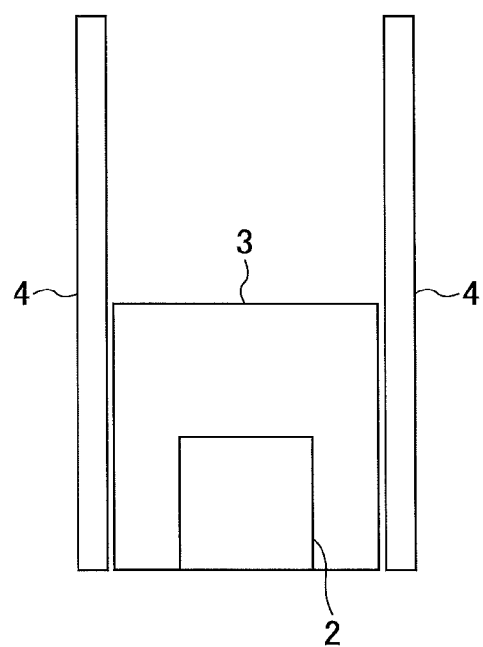
FIG. 8 is a front view for illustrating another exemplary arrangement of the first information input device, the second information input device, and the guide of the first embodiment.

FIG. 7 is a plan view for illustrating an exemplary arrangement of the first information input device, the second information input device, and the guide of the first embodiment. FIG. 8 is a plan view for illustrating an exemplary arrangement of the first information input device 2, the second information input device 3, and the guide 4 of the first embodiment. Referring to FIGS. 7 and 8, guides (walls) 4 having a predetermined height may be arranged in a direction of arranging from the first information input device 2 to the second information input device 3. As described, by providing the guides 4 on both sides of the first and second information input devices 2 and 3 in a direction of arranging from the first information input device 2 to the second information input device 3, it is possible to guide a finger related to the second information of the user so as to pass through the first information inputting area 20 for a palm related to the first information of the user.

Figure 9:
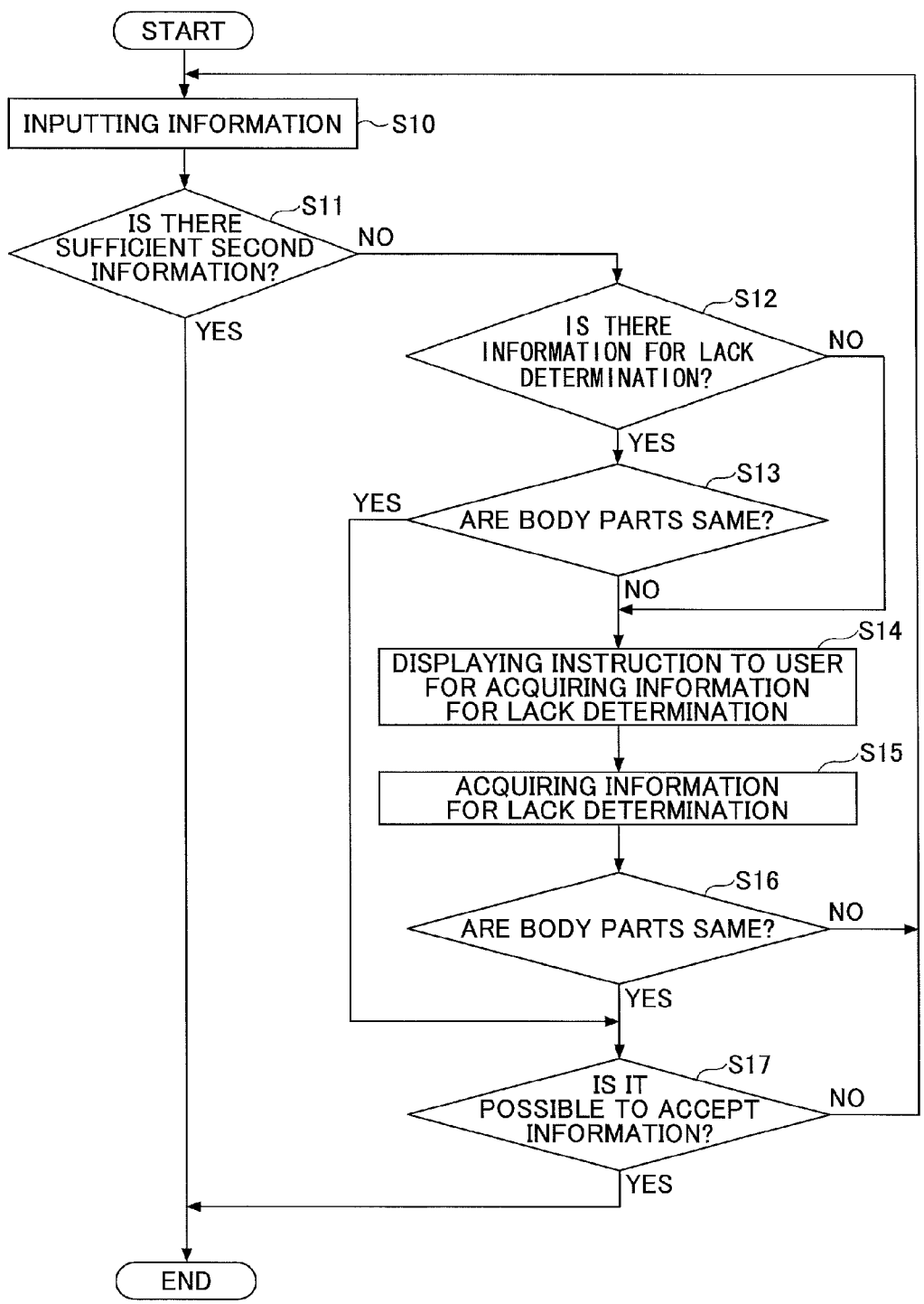
FIG. 9 is a flow chart of an authentication process performed in the multi-biometric authentication apparatus of the first embodiment.

FIG. 9 is a flow chart of an authentication process performed in the multi-biometric authentication apparatus of the first embodiment. Referring to FIG. 9, an authentication process performed by the multi-biometric authentication apparatus 1 is described.

In step S10, the user positions the hand of the user over the first information inputting area 20 of the first information input device 2 and the second information input device 30 of the second information input device 3. Thus, biometric information of a plurality of kinds including the first and second information is input. In step S11, it is determined by the information existence detecting unit 11 whether the second information exists. The information existence detecting unit 11 detects whether the biometric information sufficiently exists by applying a segmentation process to an image of fingerprints and thereafter checking the number of the input fingerprints. In step S11, for example, in a case where a predetermined number of fingerprints used for the authentication is input, it is determined that the biometric information (the second information) sufficiently exists (YES). Then, the process ends. On the other hand, the predetermined number of fingerprints used for the authentication is not input, it is determined that the biometric information does not sufficiently exist (NO). Then, the process moves to step S12. Hereinafter, when the first or second information does not sufficiently exist, said differently, when the content of or the amount of the biometric information inside the first or second information is not acquired for the authentication, this situation is called a "lack".

Here, an example of the segmentation process is illustrated. The above image of the fingerprints is divided into blocks having a predetermined size. A frequency distribution of pixel values for each block is acquired. Based on the frequency distribution of the pixel values, a block including many black pixels as result of a contact of the finger is called a "fingerprint region", and a block including a few black pixels as a result of the contact of the finger is called a "background region". After connecting blocks of adjacent fingerprint regions, the fingerprint regions having a predetermined block number or greater may be detected as fingerprint information.

Figure 10:
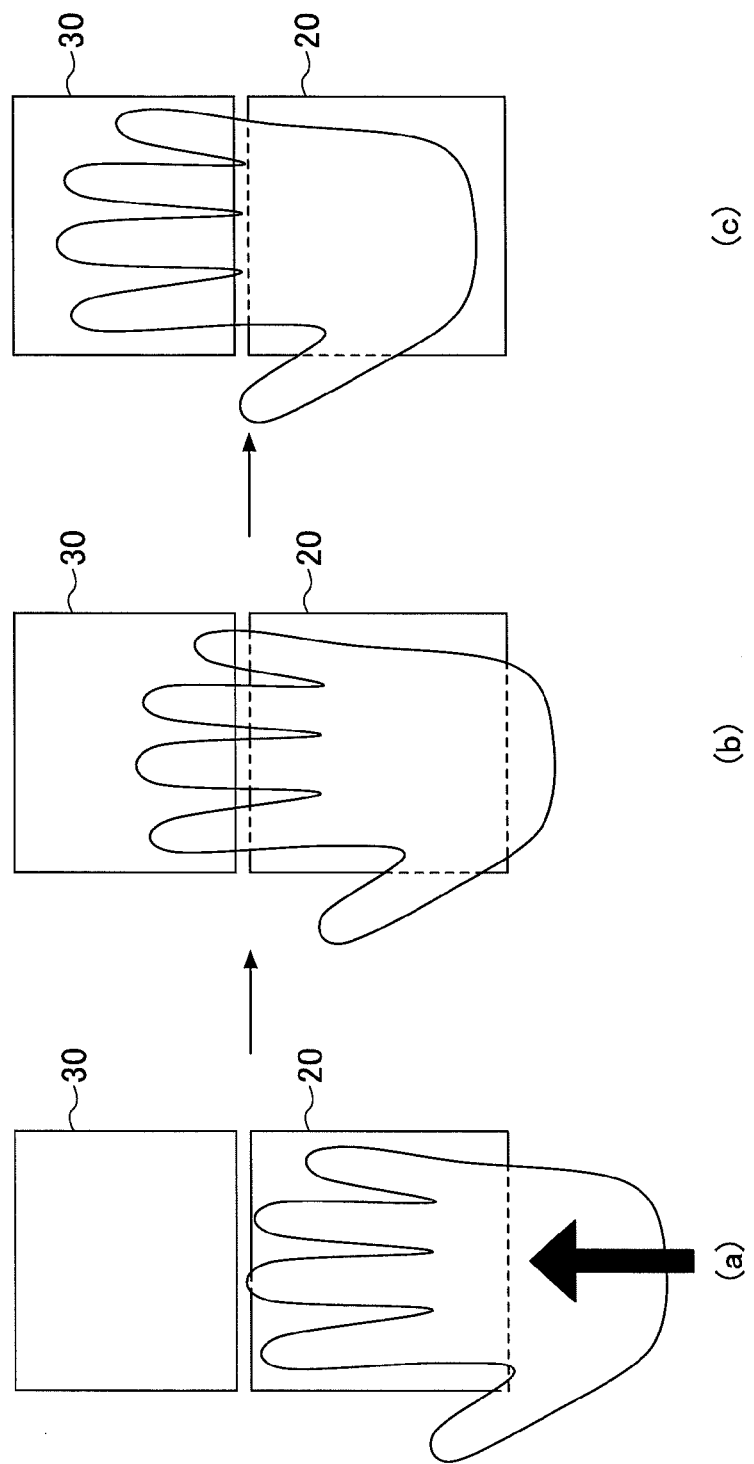
FIG. 10 illustrates an example of acquiring information for lack determination of the first embodiment while information is input.

Next, in step S12, the determination information acquiring unit 12 checks whether there is information for lack determination. Referring to FIGS. 7 and 8, guides (walls) 4 having the predetermined height may be arranged in the direction of arranging from the first information input device 2 to the second information input device 3. In this case, the finger related to the second information of the user is guided to pass through the first information inputting area 20 for the palm related to the first information. With this, an image of the finger positioned over the second information inputting area 20 of the first information input device 2 can be acquired. FIG. 10 illustrates another example of acquiring information for lack determination of the first embodiment while information is input. Referring to FIG. 10, the user moves his or her hand from a near side to a far side for inputting the biometric information, information for lack determination of the user of the finger related to the second information is acquired in the first information inputting area 20. Referring to FIG. 10, in (b), the hand is further moved. Then, it is checked whether the hand is the same by tracking the hand in the first and second information inputting areas 20 and 30. Referring to FIG. 10, in (c), the hand bridges the first information inputting area 20 and the second information inputting area 30. Then, the information for lack determination of the finger related to the second information of the user is thoroughly acquired in the first information inputting area 20. Because the images acquired in (a), (b), and (c) of FIG. 10 can be used as the information for lack determination by the determination information acquiring unit 12, the existence of the information for lack determination is checked in step S12.

If the information for lack determination exists in step S12 (YES), the process goes to step S13. On the other hand, if there is no information for lack determination (NO), the process goes to step S14.

In step S13, the identity determining unit 16 determines whether body parts are the same. The identity determining unit 16 tracks a region detected as the hand by using the first biometric information (e.g., a captured image of the palm), which is continuously acquired by the first information input device 2, and the information for lack determination (e.g., a captured image of the fingers). As illustrated in (a), (b), and (c) of FIG. 10, the identity determining unit 16 determines that the image of the same hand is captured while the tracked image is continuously acquired. Said differently, it is ensured that the hand on the same side of the same user is captured as the image at a time when it is determined that the input biometric information is not sufficient and at a time when the information for lack determination is acquired.

Otherwise, if the hand temporarily deviates from the first information input area 20 of the first information input device 20, it is determined that the hand is not that on the same side of the same user. At the time of determining the identity, the images of a plurality of frames may be temporally retroactively processed from the image of finally acquired biometric information. With these determinations, it can be ensured that the hand is not switched to the hand of another individual between when the lack of the biometric information is detected and when the lack of the biometric information actually exists.

In step S14, an instruction to the user is displayed for acquiring the information for lack determination, for example. The information input prompting unit 15 has a means for instructing the user to position the finger related to the second information of the user over the first information inputting area 20 of the first information input device 2. For example, this instruction may be displayed on a display screen so that the user can see the instruction or may be reproduced as a sound by a speaker. Further, the information input prompting unit 15 does not instruct the user in a case where the information for lack determination is acquired during the input operation by the user and the determination by the determination information acquiring unit 12 is performed.

In step S15, the finger of the user related to the second information positioned over the first information inputting area 20 of the first information input device 2 is acquired as the information for lack determination. When the finger related to the second information of the user is not positioned over the first information inputting area 20 of the first information input device 2, the information for lack determination is not acquired (NO in step S12). Therefore, in step S15 (after S14), in order to determine the identity, the finger related to the second information of the user is acquired as the information for lack determination.

Figure 11:
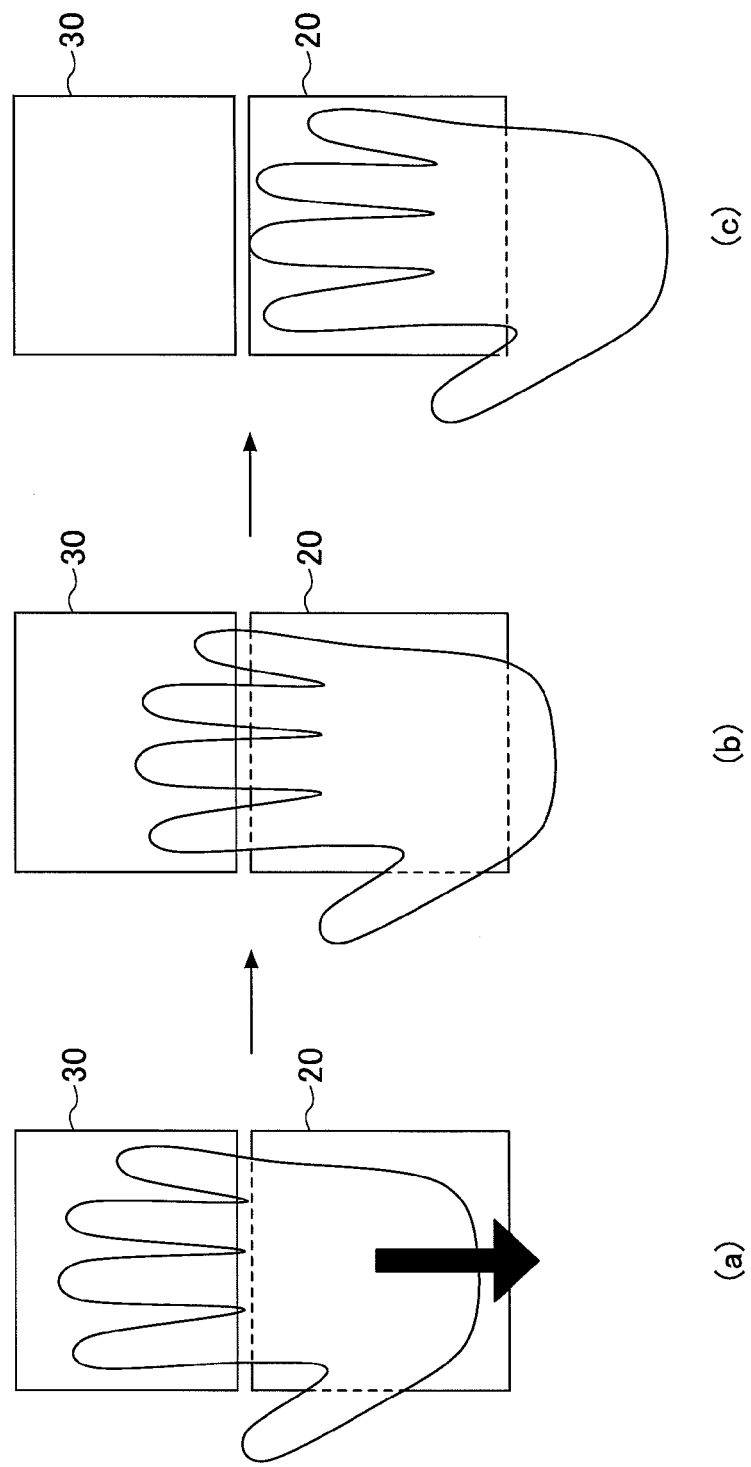
FIG. 11 illustrates an example of acquiring information for lack determination after the information is input.

Referring to FIG. 11, described is an example of acquiring the information for lack determination by the information input prompting unit 15 after inputting the biometric information. FIG. 11 illustrates another example of acquiring information for lack determination of the first embodiment after the information is input. Referring to FIG. 11, in (a), the user positions his or her hand over the first information inputting area 20 and the second information inputting area 30 so that the hand bridges over first information inputting area 20 and the second information inputting area 30. At this time, the palm is captured by the first information inputting area 20. The palm veins may be captured again by the first information inputting area 20, and the fingerprints may be captured again by the second information inputting area 30, as the biometric information. In (b), when the user moves his or her hand on the near side in response to the instruction of step S14, an image of a profile from the palm to the fingers is acquired by the second information inputting area 30. In (c), the entire fingers are captured by the first information inputting area 20 so that the information for lack determination of the fingers related to the second information of the user is acquired.

Figure 12:
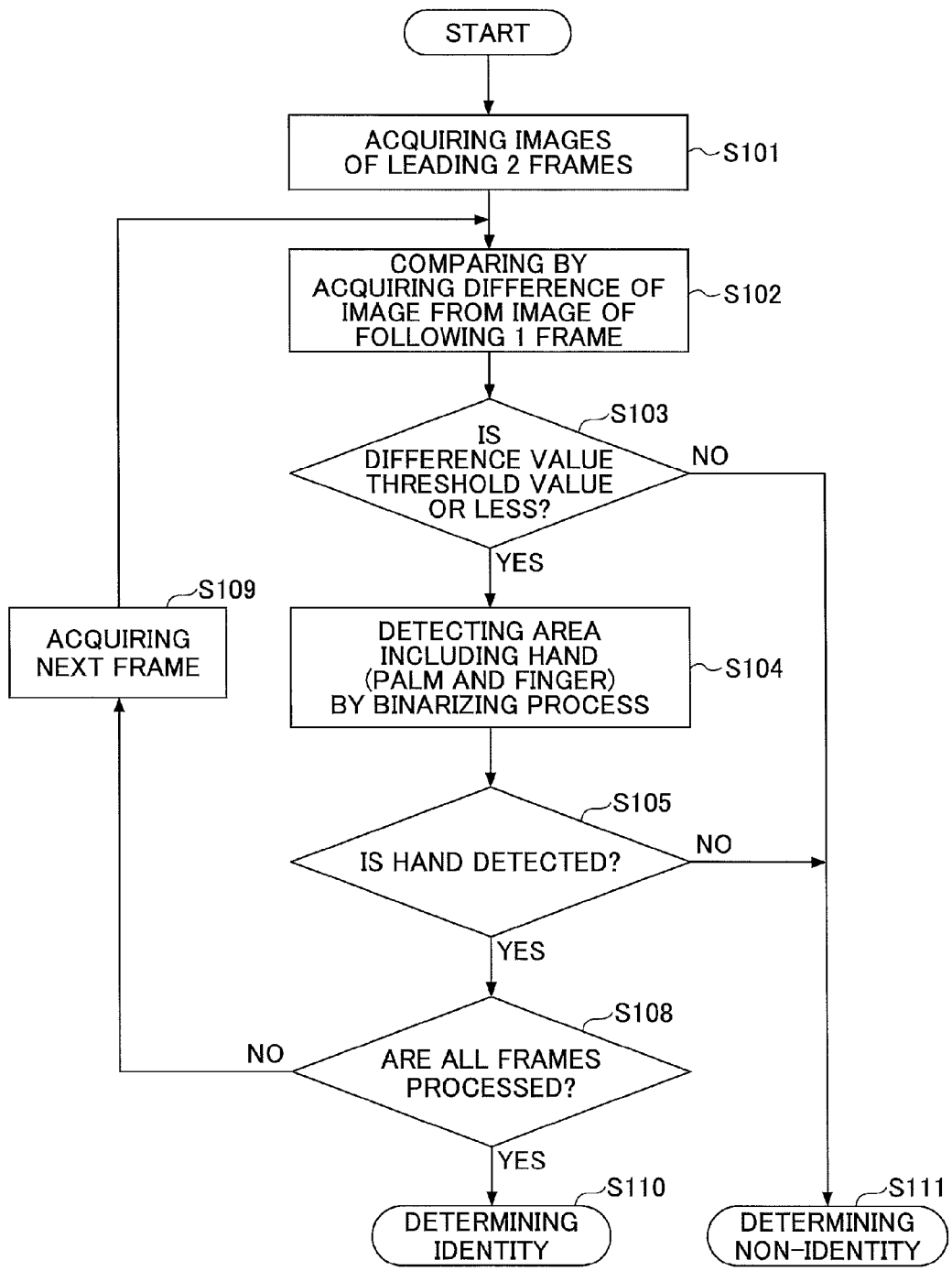
FIG. 12 is a flowchart for determining whether body parts are the same in the first embodiment.

In step S16, it is determined whether the part is the same based on the acquired information for lack determination. FIG. 12 is a flowchart for determining whether body parts are the same in the first embodiment. While the biometric information is acquired, the information for lack determination is also acquired. In order for this, while the fingers are moved over the first information inputting area 20 of the first information input device 2, a plurality of images continuously captured by the first information inputting area 20 of the first information input device 2 are used. The information for lack determination is this plurality of continuously captured images.

Referring to FIG. 12, the determination whether the body parts are the same is started in the identity determining unit 16. In step S101, images of the leading 2 frames among the plurality of continuously captured images are acquired. In step S102, the image of the leading frame and the image of the second leading frame are compared by calculating a difference between these images. In step S103, it is determined whether the difference value is equal to or less than a predetermined threshold value or smaller. If the difference value is not equal to or less than the threshold value (NO) in step S103, it is determined that the fingers captured in the frames are different and the body parts are not the same in step S111. On the other hand, if the difference value is equal to or less than the threshold value (YES) in step S103, it is further determined whether the body parts are the same in step S104.

In step S104, the acquired image undergoes a binarizing process, and is separated into the region including the hand, which includes the palm and the fingers, and the background region. Then the hand is detected. In step S105, it is determined whether the hand is detected. If the hand is not detected (NO) in step S105, it is determined that the hand deviates from the first information inputting area 20 and the body parts are not the same in step S111. On the other hand, if the hand is detected (YES) in step S105, the process goes to step S108 to further determine whether the body parts are the same.

In step S108, it is determined whether all frames are compared in step S102. If the all frames have not been compared (NO), the image of the next frame is acquired. Then, in step S102, the image of the next frame and the image of the frame next to the next frame are compared by calculating these images. On the other hand, if all the frames are compared and the process ends (YES in step S108), it is determined that the body parts are the same in step S110.

In the determination of whether the body parts are the same in FIG. 12, the acquired images may be sequentially processed in synchronism with the image captures in the first information input device 2, or the acquired and stored images may be processes in asynchronism with the image captures.

Returning to FIG. 9, in step S16, the identity determining unit 16 tracks the region detected as the hand using the first information (the images capturing the palm) continuously acquired by the first information input device 2 as described above and the information for lack determination (the images capturing the fingers). The identity determining unit 16 determines the same hands are captured (YES) while the tracked images are continuously acquired. Said differently, it is ensured that the hand on the same side of the same user is captured as the image at the time when it is determined that the input biometric information is not sufficient and also at the time when the information for lack determination is acquired. On the other hand, if the hand temporarily deviates from the first information input area 20 of the first information input device 2 (NO), it is determined that the hand is not that on the same side of the same user. In a case where the body parts are determined not to be the same (NO), the multi-biometric authentication apparatus 1 waits for another information input in step S10. On the other hand, in a case where the body parts are determined to be the same, the process goes to step S17.

In step S17, the information acceptance determining unit 13 determines whether the first and second information, which have passed the determinations in the information existence detecting unit 11, the determination information acquiring unit 12, and the identity determining unit 16, is acceptable. In a case where the existence of the biometric information is sufficient and in a case where the biometric information is determined as the biometric information (the hand) of the same user even through the biometric information is actually lacking, the input biometric information is accepted as an object of the authentication process (YES in step S17). On the other hand, if the existence of the biometric information is insufficient and there is a pseudo lack in the biometric information and in a case where biometric information actually lacks and the biometric information is not derived from the user, the input biometric information is not accepted as the object of the authentication process (NO in step S17).

Figure 13:
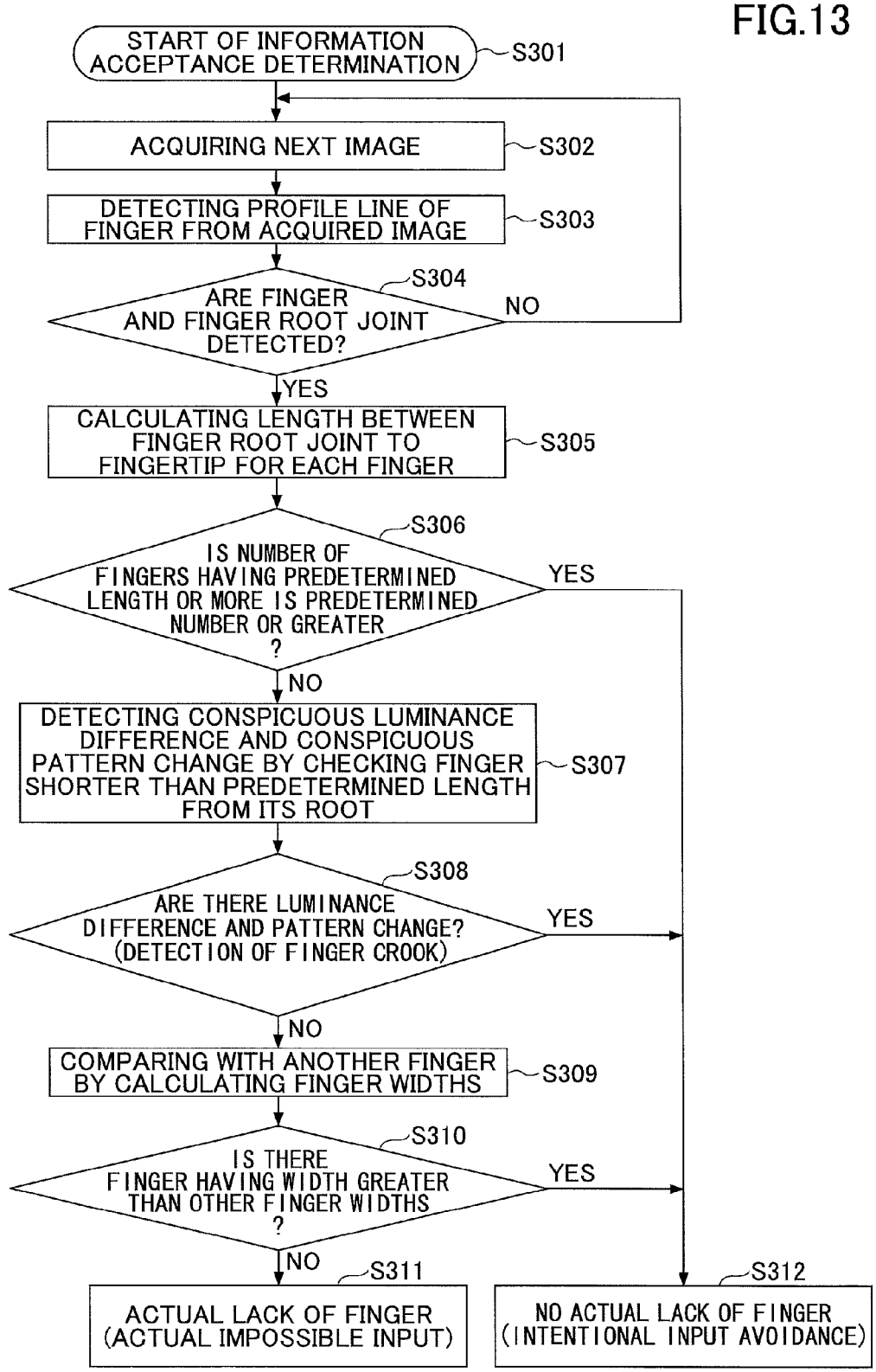
FIG. 13 is a flowchart for determining whether information of a biological object is accepted in the first embodiment.

FIG. 13 is a flowchart illustrating details of information acceptance determination related to step S17 of FIG. 9. In the process illustrated in FIG. 13, in synchronism with the image acquisition in the first information input device 2, images may be sequentially acquired. Alternatively, temporarily stored images may be processed later which are not in synchronism with the image acquisition.

If the information acceptance determination is started in step S301, the determination information acquiring unit 12 acquires the image (the information for lack determination) captured by the palm vein sensor 21 in step S302. The determination information acquiring unit 12 detects the profile line of the hand including the fingers by binarizing the image based on the threshold, with which the background region is separated from the region of the hand. At this time, a region extending in a longitudinal direction and having profile lines on both sides arranged substantially in parallel is detected as the finger in step S303. Next, a portion where the profile line protrudes downward, e.g., the lowermost position, is detected as the root of the finger in step S304. Further, a portion where the profile line protrudes upward, e.g., the uppermost position, is detected as the fingertip of the finger in step S304. After the fingertip and the roots of the finger are detected (YES) in step S304, the length of the finger from the middle point between the roots on both ends of the finger to the fingertip in step S305. Meanwhile, if the fingertip and the root of the fingers are not detected (NO) in step S304, the process goes back to step S302. In step S302, the determination information acquiring unit 12 acquires the next image (the information for lack determination) captured by the palm vein sensor 21.

Next, if the length of the finger is longer than the predetermined threshold value, it is assumed that the finger is properly acquired, and the number of the properly acquired fingers is counted in step S306. If the number of the fingers having the predetermined length or greater (YES), it is determined that there is no lack of the fingers in step S312. If there is no lack of the fingers even though the second information insufficiently exists in step S11, there is a high probability that the biometric information is intentionally avoided. Therefore, NO is chosen in the information acceptance determination in step S17. On the other hand, in the case where there is a finger shorter than the predetermined length in step S306 or the number of the detected fingers is less than the predetermined number (NO), there is a probability that the finger is actually lacking and the process moves to step S307 so that the information acceptance determination is continued.

In step S307, a conspicuous luminance difference and a conspicuous pattern change are detected from the root of the finger having a length smaller than the predetermined length. As a result, it is determined whether there is the conspicuous luminance difference or the conspicuous pattern change in step S308. If there is a conspicuous luminance difference or a conspicuous pattern change, it is detected that the finger is crooked inward (hereinafter, this is referred to as "finger crook") in YES in step S308. Then, it is determined as a pseudo lack where there is no actual lack of the finger in step S312. Meanwhile, if there is no conspicuous luminance difference or no conspicuous pattern change, it is detected that there is no finger crook (NO in step S308). Then, the process goes to step S309.

In step S309, the finger widths are calculated and compared between different fingers. As a result, it is determined whether there is a finger having a finger width greater than those of the other fingers in step S310. If there is a finger having the finger width greater than those of the other fingers (YES in step S310), it is determined as the pseudo lack where there is not an actual lack of the finger in step S312. On the other hand, if there is no finger wider than the other fingers (NO in step S310), it is determined that the finger is actually lacking and the biometric information is not actually input in step S311.

Figure 14:
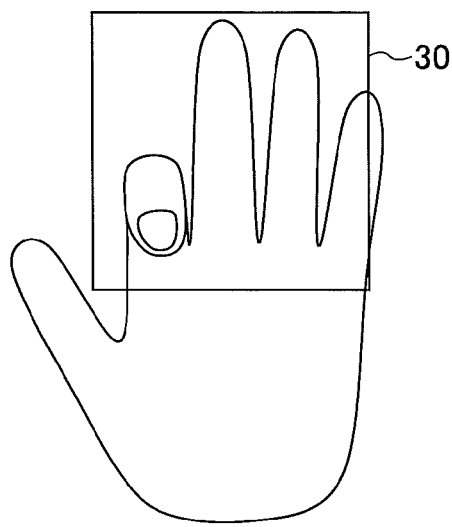
FIG. 14 illustrates an example of a pseudo lack of the first embodiment.
Figure 15:
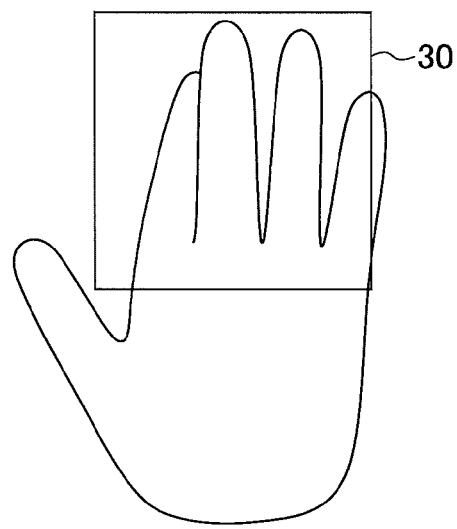
FIG. 15 illustrates another example of the pseudo lack of the first embodiment.

FIG. 14 illustrates an example of pseudo lack of the first embodiment. FIG. 15 illustrates another example of pseudo lack of the first embodiment. Referring to FIGS. 14 and 15, the pseudo lack of the biometric information is described in detail. In steps S307 to S310 of FIG. 13, the pseudo lack is determined. The object of the pseudo lack where an input of biometric information is intentionally avoided is for an impersonation where a person other than a genuine individual is to be successfully authenticated or the like.

Examples of the pseudo lack of the biometric information in the first embodiment are a case where the finger is warped upward, a case where the finger is crooked inward (the finger crook), a case where the finger overlaps a next finger, or the like. In the case where the finger is upward warped, the palm vein sensor 21 captures the warped finger, the actual lack of the finger is not determined by steps S301 to S311. Therefore, it is possible to prevent the pseudo lack in the case of upward warping of the finger upward.

Referring to FIG. 14, there are many cases where the finger shorter than the predetermined threshold value exists in the case where the finger is crooked. Therefore, in step S307, the region of the short finger is checked from the root of the finger (on the side of the palm) to detect the conspicuous luminance difference caused by an approach of the crooked finger toward the sensor and the conspicuous pattern change caused by overlapping of the fingers. In YES in step S308, in a case where the pattern change is detected, it is determined that the biometric information does not sufficiently exist due to the pseudo lack.

Referring to FIG. 15, in the case where the finger overlaps the next finger, there are many cases where the widths of the root and the vicinity thereof are wide. In step S310, the finger widths of the fingers, e.g., the length between the roots, are calculated and compared. In YES in step S310, in a case where there is a finger wider than the other fingers, it is determined that the biometric information does not sufficiently exist due to the pseudo lack.

Referring back to FIG. 9, in a case where the input biometric information is not accepted as the object of the authentication process in the information acceptance determination of step S17 in NO in step S17, the process goes to step S10 to await an information input. For example, it may be requested to input the biometric information again. On the other hand, when the input biometric information is accepted as an object of the authentication process in YES in step S17, the authentication process by the multi-biometric authentication apparatus 1 is completed.

Although the fingerprints are used as the second information above, finger veins may be used as the second information. In this case, the second information input device 3 includes the vein sensor.

As described above, according to the multi-biometric authentication apparatus 1, in a case where the second information has a lack, a second body part related to the second information is input into the first information input device 2. Based on the acquired information for lack determination, it is determined whether the lack of the biometric information actually exists or is the pseudo lack. Only in the case where the lack of the biometric information actually exists, the biometric information is accepted. Therefore, while allowing the actual lack of the biometric information, it is possible to prevent a threat of impersonation where an attacker does not intentionally input biometric information.

Further, by continuously causing the first information input device 2 to acquire the first information and the information for lack determination, it is determined that the first body part related to the first information and the second body part related belong to the same user between the time of detecting the lack of the biometric information and the time when the lack of the biometric information is determined to be the actual lack. By following the above process, an impersonation where a body part is changed to a body part of another person or the like can be prevented.

Further, by using a noncontact type sensor used as the first information input device 2, a pseudo lack difficult to be detected by a contact type sensor can be detected. As described, the impersonation can be effectively prevented.

Further, because the second information input device 3 acquires the second information from a body part in the vicinity of the first body part related to the first information, the biometric information of the two kinds, e.g., the palm and the fingers, is input by a single input operation. Therefore, convenience for users is high, and an impersonation where first and second body parts belonging to different persons as input is low.

Further, on both sides of the first and second information inputting areas 20 and 30, the guide (wall) 4 is installed in the direction of arranging from the first information input device 2 to the second information input device 3. With this, it is possible to guide the second body part related to the second information input by the user so that the second body part is always positioned and passes over the first information inputting area 20 of the first information input device 2. Therefore, the information for lack determination can be acquired during the input operation to enable the lack determination.

Second Embodiment

The second embodiment of the present invention is described.

Figure 16:
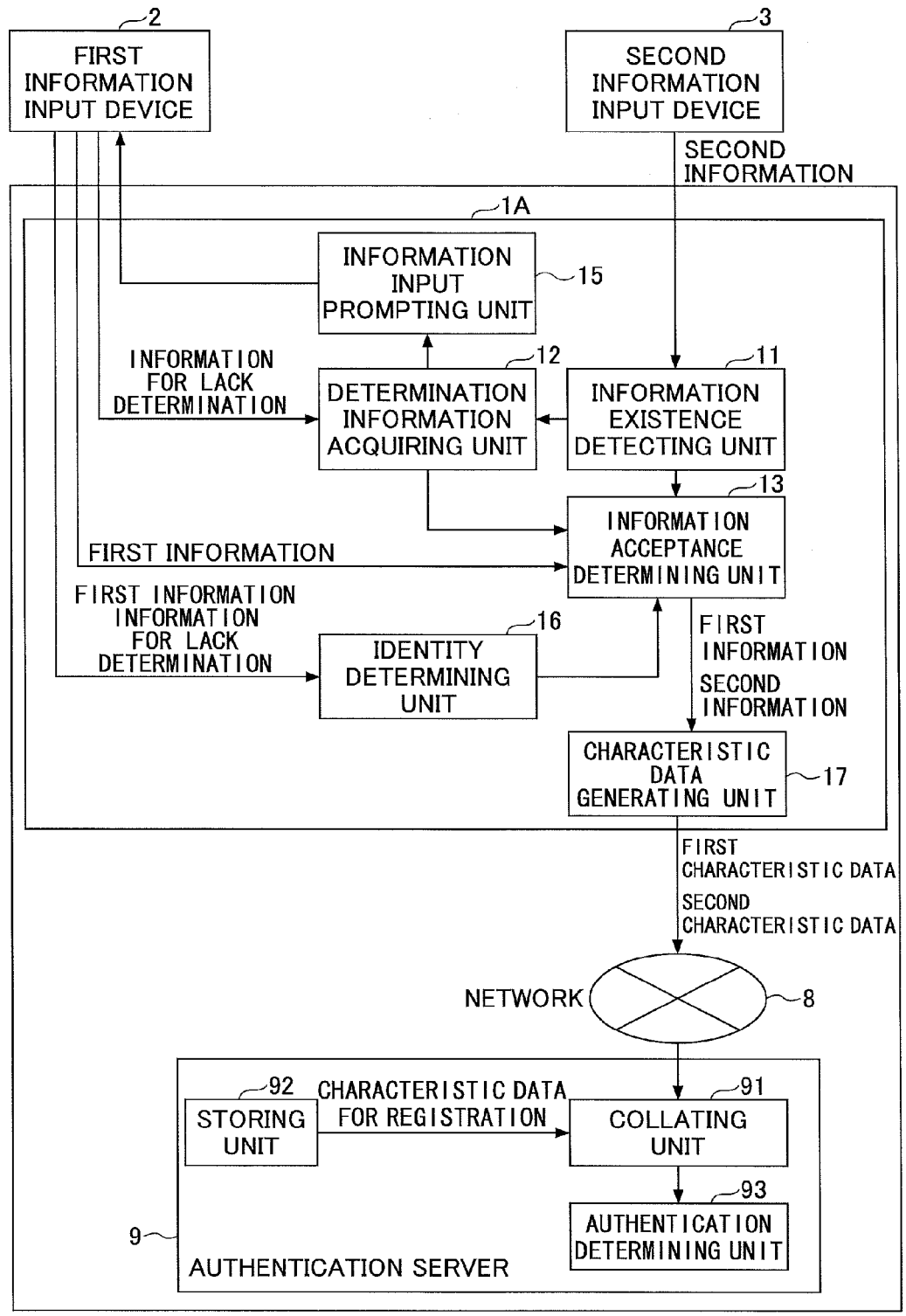
FIG. 16 is a block diagram illustrating a structure of a multi-biometric authentication apparatus of a second embodiment.

FIG. 16 is a block diagram illustrating the structure of a multi-biometric authentication apparatus of the second embodiment. The multi-biometric authentication system 10 includes a multi-biometric authentication apparatus 1A, an authentication server 9, and a network 8 connecting the multi-biometric authentication apparatus 1A to the authentication server 9.

Although the multi-biometric authentication apparatus 1A basically has the same structure as that of the multi-biometric authentication apparatus 1 of the first embodiment, the multi-biometric authentication apparatus 1A further has the characteristic data generating unit 17. The characteristic data generating unit 17 receives the first information and the second information, which are objects determined to be received by the information acceptance determining unit. The characteristic data generating unit 17 generates characteristic data of each of the first and second information as the first characteristic data and the second characteristic data, and sends the first characteristic data and the second characteristic data to the authentication server 9 for authentication.

The other elements of the multi-biometric authentication apparatus 1A, namely the information existence detecting unit 11, the determination information acquiring unit 12, the information acceptance determining unit 13, the information input prompting unit 15, and the identity determining unit 16 have the same functions as those in the first embodiment. Therefore, the explanation of the other elements is omitted.

The authentication server 9 includes a collating unit 91, a storing unit 92, and an authentication determining unit 93. Characteristic data of the biometric information of the user are registered as characteristic data for registration in the storing unit 92. The characteristic data for registration includes first information for registration and second information for registration corresponding to the first information and the second information, respectively. The collating unit 91 collates the first and second characteristic data, which are sent from the characteristic data generating unit 17 of the multi-biometric authentication apparatus 1A with the first and second characteristic data for registration, respectively. The authentication determining unit 93 determines whether the first and second characteristic data sent from the characteristic data generating unit 17 of the multi-biometric authentication apparatus 1A are authenticated as having authenticity. Here, the storing unit 92 may include a database, in which the characteristic data for registration are stored.

The multi-biometric authentication system 10 may be formed by aggregating functions of the multi-biometric authentication apparatus 1A, the authentication server 9, and the network 8 instead that the multi-biometric authentication apparatus 1A, the authentication server 9, and the network 8 are installed in the multi-biometric authentication system 10.

Figure 17:
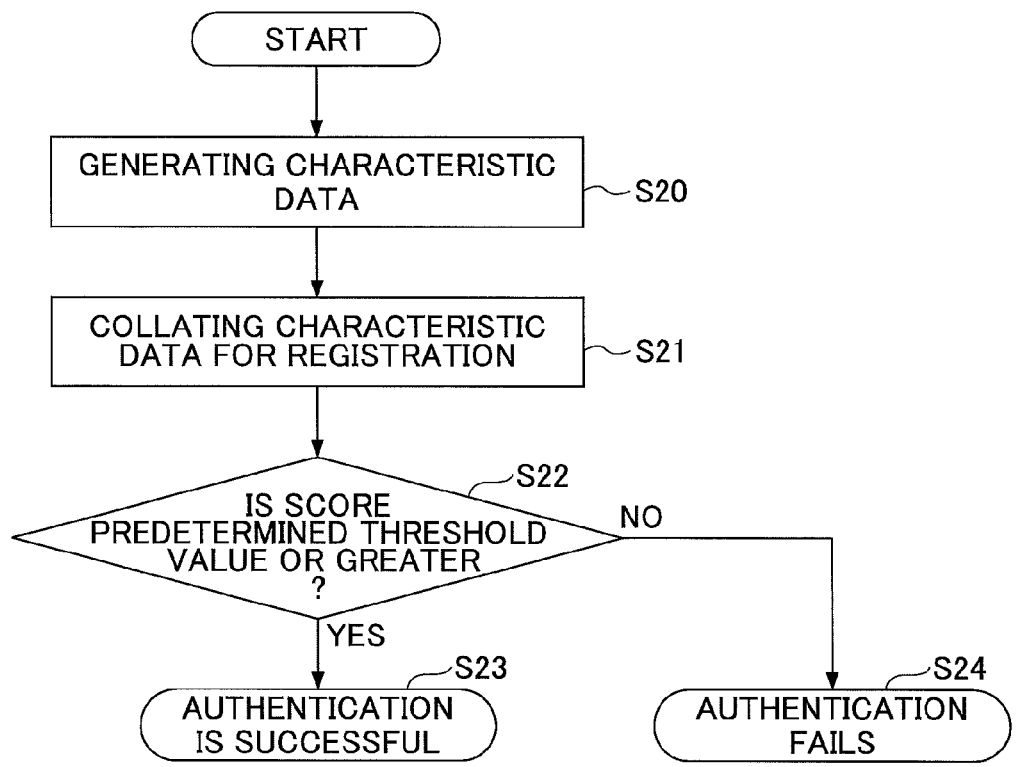
FIG. 17 is a flow chart of an authentication process performed in the multi-biometric authentication system of the second embodiment.

FIG. 17 is a flow chart of an authentication process performed in the multi-biometric authentication system 10 of the second embodiment. The processes in the flowchart of FIG. 17 are subsequently performed after it is determined that the information is acceptable (YES in step S17) in the information acceptance determination of the flowchart of the authentication process of the multi-biometric authentication apparatus 1 of the first embodiment illustrated in FIG. 9. Said differently, the processes between steps S10 to S16 are performed in a manner similar to the first embodiment illustrated in FIG. 9. Therefore, the explanation of steps S10 to S16 is omitted.

In a manner similar to the first embodiment, the information acceptance determining unit 13 determines whether the first and second information, which is input based on the results of determination in the information existence detecting unit 11, the determination information acquiring unit 12, and the identity determining unit 16 in step S17 of FIG. 9. In a case where the input biometric information is not accepted as the object of the authentication process in the information acceptance determination in NO in step S17, the process goes to step S10 to await an information input. For example, it may be requested to input the biometric information again. Further, in a case where the reason why the biometric information is insufficient is a pseudo lack, it is determined that the input is by an impersonation where the biometric information is intentionally made insufficient. Then, the account of the user to be authenticated may be locked so as not to be temporarily authenticated.

On the other hand, when the input biometric information is accepted as the object of the authentication process in YES in step S17, the authentication process by the multi-biometric authentication apparatus 1A is completed.

After the authentication process illustrated in FIG. 17 is started, the characteristic data generating unit 17 generates the first and second characteristic data, which are used for the collating process, based on the image of palm veins as the first information and the fingerprint images as the second information, which are accepted by the information acceptance determining unit 13, respectively, in step S20.

In step S21, the collating unit 91 collates the characteristic data for registration (the first and second characteristic data for registration) previously stored in the storing unit 92 with the characteristic data (the first and second characteristic data), which are generated at the time of the authentication. In the collating process, the first characteristic data for registration is collated with the first characteristic data, and the second characteristic data for registration is collated with the second characteristic data. As described, collation scores (i.e., first collation score and a second collation score) for each of the first and second characteristic data are calculated. Here, the collation score may be a score where both of the first and second collation scores are considered.

As the collation score is high, it is determined that the registrant who registers the characteristic data for registration and the user who inputs the biometric information are highly likely the same person. On the other hand, as the collation score is lower, it is determined that the registrant who registers the characteristic data for registration and the user who inputs the biometric information are less likely the same person. The collating process depends on the kind of the biometric information to be used. For example, minutiae matching or pattern matching may be used on the fingerprint authentication.

In step S22, the authentication determining unit 93 determines whether the authentication is successful from the first and second collation scores, which are calculated by the collating unit 91. These collation scores may be individually judged and the results of judgment may be combined by the AND logic operation to determine the success of authentication. Instead, these collation scores may be individually judged and the results of judgment may be combined by the OR logic operation to determine the success of authentication. Instead, a collation score may be calculated by merging by a method of merging score levels. This collation score may be used to determine the success of authentication. If the collation score corresponds to similarity and is a predetermined threshold value or greater (YES in step S22), it is determined that the authentication is successful in step S23. If the collation score is less than a predetermined threshold value (NO in step S22), it is determined that the authentication fails in step S24. Meanwhile, if the collation score corresponds to a difference (a distance) and is a predetermined threshold value or greater, it is determined that the authentication is successful. If the collation score is less than the predetermined threshold value, it is determined that the authentication fails.

In the multi-biometric authentication system having the authentication function for collating the characteristic data for registration, which are previously stored, while admitting a lack of biometric information, it is possible to avoid an impersonation where an attacker intentionally does not input the biometric information. Further, by controlling an attacker so as not to be temporarily authenticated, it is possible to prevent a continuous impersonation.

According to the embodiments, a threat of impersonation can be prevented in a case where biometric information has a lack.

For example, there is a threat of impersonation where an attacker intentionally reduces input biometric information. In an authentication system, in which an operator attends when the biometric information is input at, for example, a teller window in a financial institution, or in an authentication system, in which although an operator does not attend and the input of the biometric information is checked through a security camera or the like at, for example, an automated teller machine (ATM) in a financial institution, monitoring acts as a deterrent against occurrence of the threat of impersonation. As biometric authentication is increasingly performed through an open network in recent years, the above described attendance of the operator or the checking through the security camera or the like are not available. Therefore, there is no countermeasure to these impersonations. However, according to the techniques of the embodiments, a false rejection rate can be reduced. Therefore, while admitting a lack of biometric information, a threat of impersonation is avoidable.

A pseudo lack determining unit is one example of the information acceptance determining unit 13

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An authentication apparatus for authenticating using biometric information including vein information related to a palm input into a vein information inputting area and fingerprint information related to fingers input into a fingerprint information inputting area, the authentication apparatus comprising:
   a computer that executes a process including
   detecting that a lack of the biometric information exist, when it is determined, based on the fingerprint information, that a predetermined number of fingerprints used for an authentication is not input;
   acquiring information for lack determination pertinent to the finger from the vein information input into the vein information inputting;
   detecting a number of the fingers by using the information for the lack determination, when it is determined that a region detected as the palm represents a same palm by tracking the region by using the vein information and the information of the lack determination; and
   suppressing the authentication using the vein information and the fingerprint information when there is no lack of the finger based on the detected number of the fingers.

2. The authentication apparatus according to claim 1, wherein the computer executes the process further including prompting the input of the fingerprint information into the vein information inputting area depending on the information for lack determination.

3. The authentication apparatus according to claim 1, wherein the computer executes the process further including determining, when the fingerprint information and the information for the lack determination are temporally continuously input, that the fingers related to the fingerprint information and the information for the lack determination are the same.

4. The authentication apparatus according to claim 1, further comprising:
   a vein information input device that can acquire the biometric information input into the vein information inputting area; and
   a fingerprint information input device that can acquire the biometric information input into the fingerprint information inputting area,
   wherein the vein information inputting area is arranged next to the fingerprint information inputting area.

5. The authentication apparatus according to claim 4, further comprising:
   a guide that guides the input of the biometric information, the guide being provided on both sides of a direction of arranging the vein information inputting area of the vein information input device and the fingerprint information inputting area of the fingerprint information input device.

6. The authentication apparatus according to claim 4, wherein the vein information input device is a noncontact type sensor.

7. A computer-readable, non-transitory medium storing a authentication program for authenticating using biometric information of a plurality of kinds including vein information related to a palm input into a vein information inputting area and fingerprint information related to fingers input into a fingerprint information inputting area that causes a target computer to perform a process, the process comprising:
   detecting that a lack of the biometric information exist, when it is determined, based on the fingerprint information, that a predetermined number of fingerprints used for an authentication is not input;
   acquiring information for lack determination pertinent to the finger from the vein information input into the vein information inputting;
   detecting a number of the fingers by using the information for the lack determination, when it is determined that a region detected as the palm represents a same palm by tracking the region by using the vein information and the information of the lack determination; and
   suppressing the authentication using the vein information and the fingerprint information when there is no lack of the finger based on the detected number of the fingers.

* * * * *